UNITED STATES PATENT OFFICE.

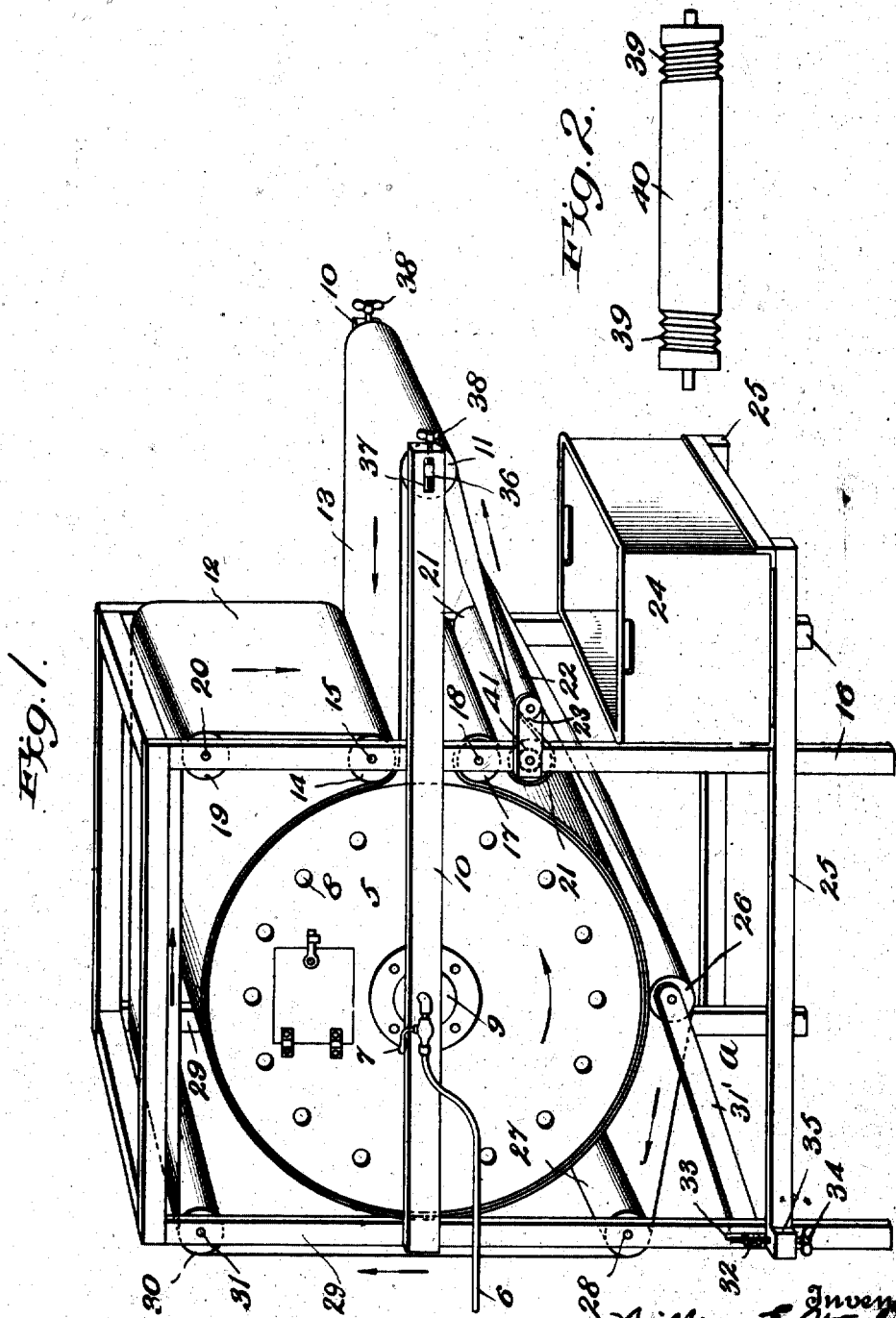

WILLIAM E. STROMBERG, OF NEW YORK, N. Y., ASSIGNOR OF ONE-HALF TO EDWARD H. SCHMICKING, OF NEW YORK, N. Y.

PRINT-DRYING MACHINE.

1,234,410.  Specification of Letters Patent.  Patented July 24, 1917.

Application filed July 7, 1916. Serial No. 107,8..

*To all whom it may concern:*

Be it known that I, WILLIAM E. STROMBERG, a citizen of the United States, residing at New York, county and State of New York, have invented certain new and useful Improvements in Print-Drying Machines, of which the following is a specification.

This invention relates to machines for drying photographic prints; and the general object of the invention is to increase the efficiency of a mechanical print drier in point of adapting the same to operate upon and deliver in a dry condition, in a given length of time, a greater number of prints than has heretofore been possible with a machine of this kind. And to this end the invention resides in arranging the print carrier with such relation to the heated drier that the wet prints on entering the machine are first carried over the hottest portion of the drier.

Other objects will appear and be better understood from that embodiment of my invention of which the following is a specification, reference being had to the accompanying drawings forming part hereof, and in which:

Figure 1, is a perspective view of the invention.

Fig. 2, is a detail front elevation of one of the rolls.

The print carrier of this invention comprises a metallic drum 5, of any required size, which is adapted to be heated in any suitable manner as for instance by a Bunsen burner (not shown) which is disposed within the drum. A gas supply pipe 6, is connected to the burner and a valve 7, controls the flow of gas through the pipe 6, to the burner. A series of end openings 8, are formed in the drum and the air supply to the burner passes through these openings. The drum 5, is disposed horizontally in a supporting frame "*a*" which has an intermediately disposed lateral extension formed by the projecting end portions of a pair of oppositely disposed rails 10—10. The drum 5, is rotatively mounted on bearings 9—9, which are secured to the rails 10—10 and the said bearings are so disposed that the drum is supported with its axis substantially parallel with the axis of a roll 11, carried by the lateral extension of the frame "*a*". The gas supply pipe 6, passes through one of the rails 10, and through one of the bearings 9, and the burner (not shown) may be supported by one or both of the said bearings.

The print carrier consists of a pair of endless belts superimposed one upon the other and hereinafter referred to as an outer belt 12 and an inner belt 13. These belts are formed of absorbent material and conform in width substantially to the length of drum 5, around which they are disposed as shown. A roll 14, the opposite ends of whose shaft 15, are journaled in the uprights 16—16, at the front of supporting frame "*a*", is disposed a trifle above a point in horizontal alinement with the axes of drum 5 and roll 11, and a second roll 17 the ends of whose shaft 18 are journaled in the uprights 16—16, is disposed in alinement with roll 14, and a trifle below a point in horizontal alinement with the axes of drum 5 and roll 11. The belts 12 and 13 pass under roll 14 and over roll 17 whereby the said rolls operate to cause the belts 12 and 13 to cover all except a relatively small segment of the side wall of the drum. This is of importance in that when the drum rotates and the belts move therewith a maximum of belt surface is exposed to the heat of the drum. From roll 14 the belt 12 passes upwardly and over a roll 19 the ends of whose shaft 20 are journaled in the upper end portions of the uprights 16—16, but the belt 13 is directed horizontally and outwardly over roll 11. This disposition of the belts provides an entrance through which the prints can be directed and further adapts the outwardly extending portion of belt 13 to function as a support on which the prints can be arranged preparatory to their entering between the belts. From rolls 17 the belts 12 and 13 are directed inwardly then over and under roll 21 which is arranged adjacent to roll 17 and in vertical alinement therewith. From roll 21 the belts 12 and 13 are directed upwardly and over roll 22, which is in horizontal alinement with roll 21 and supported by bracket arms one of which is shown and indicated by 23. From roll 22 belt 13 extends to roll 11 but belt 12 is directed downwardly and over roll 22. This disposition of the belts 12 and 13 causes the said belts to separate at the roll 22 and it will be noted that the line of separation of the said belts is disposed outwardly and beyond the uprights 16—16, and in alinement with a receptacle 24, which is removably secured to a support formed by the end portions of the lower rails 25—25, which project beyond the uprights 16—16. From roll 22 belt 12 is directed downwardly and under roll 26 then rearwardly and under roll 27 the ends of whose shaft 28 are journaled in the rear uprights 29—29, of support "a", then upwardly and over roll 30, the ends of whose shaft 31 are journaled in the upper end portions of uprights 29 then forwardly to roll 19. Roll 26 is supported by a pair of arms one of which is shown and indicated by 31'. These arms are adapted to be turned and thereby cause the roll to move bodily to vary the tension on belt 12 whenever found necessary. The arm shown is provided at its outer end portion with a laterally extending head 32 arranged so as to slide in a slot 33 into upright 29. A thumb screw 34 passes through a threaded opening in a lateral lug 35 and screws into the head 32. Obviously with this construction when the thumb screw 34 is turned in one direction the roll 26 is depressed and belt 12 thereby tightened. A belt adjuster is also provided for belt 13. In the present instance roll 11 carries at its ends heads one of which is shown and indicated by 36. These heads are adapted to slide in slot 37 in the rails 10. Thumb screws 38 screw into openings in the ends of the rail 10, which also screw into openings in the heads 36, so that by turning the screws 38, the distance between the roll 11 and the drum 5, is varied.

The several rolls previously described are constructed so as to prevent skewing of the belts 12 and 13. This is most necessary in a device of this kind where prints of different sizes are frequently operated upon simultaneously. In such instances certain sections of the belts become more wet than others, and this uneven wetting results in the relatively wet portions stretching to a greater extent while the belt is in motion than the drier portions so that unless provision is made to compensate for this uneven stretching the belts will creep laterally on the rolls. With the construction shown in Fig. 2 it will be observed that creeping is prevented by reason of the threaded portions 39—39, at the opposite end portions shown in the roll 40. The threads of these portions may extend in corresponding or right and left hand directions.

The device of this invention is operated by a suitable motor arranged so as to be connected by a sprocket chain or its equivalent to a pulley 41. When the motor is in operation the drum turns in the direction of the arrow and by reason of the portions of the belts 12 and 13 which extend around the drum being in frictional contact, the said belts move as a unit and in the direction indicated by arrows. When the prints are arranged on the portion of the belt 13 previously described the motion of the said belt carries the prints underneath the roll 14 and belt 12. It will now be noted that when the prints are entered into the space between the belts 12 and 13 these move the prints upwardly so that the heat of the portion of the drum over which the prints are disposed gradually increases substantially throughout the first half of a revolution of the drum. This is of importance because the prints are saturated with water upon entering between the belts and unless the belts which absorb this water are quickly dried stretching and uneven running of the belts will result. The speed of rotation of the drum is such that the heat effects the drying of the prints before these are carried by the belts to roll 17, but the prints having been dried on the curved surface of the drum have a curl conforming to the curvature of the drum. It will now be noted that the presence of roll 17 causes the belts on leaving the drum to move downwardly. This has the effect of curling the prints in the opposite direction and since the radius of roll 17 is less than that of the drum it is obvious that the roll 17 operates to remove the curvature from the prints imparted thereto from the drum. It will be further noted that the diameter of roll 21 is substantially the same as roll 17, and that the belts 12 and 13 are so disposed on roll 21 that this roll will operate to curve the prints reversely as these are carried over the said roll by the said belts. When the prints are carried from the drum they are curled in a direction opposite to that which they tend to curl under the action of their coated surfaces. But when the prints are operated upon by the roll 17 they are curled in the way they tend to curl normally. In passing around the roll 21 however the prints are curved in the direction in which they are curved by the drum and this rebending or recurving of the prints compensates for the bending or curving made by roll 17 so that when the prints move to roll 22 and where the belts 12 and 13 separate, the said prints are substantially straight and in that shape fall into receptacle 24.

It will be noted that roll 22 is considerably less in diameter than roll 21, so that if a portion or portions of the coated surfaces of the prints adhere to the belt and tend to move therewith around roll 22, the reluctance of the paper to curl abruptly to the sharp curvature of that roll will invariably operate to detach the portion or portions of the coated surfaces which stick to the belt. Obviously by directing the belt 12 around the rolls 22, 26, 28, 30 and 19 a generous portion of the belt is at all times left exposed when not engaged in the operation of drying prints. This permits the heated air surrounding the machine to dry the belt thoroughly before the same moves into contact with belt 13.

What is claimed as new is:

1. In a print drier the combination of a supporting frame, a drum rotatively mounted in the frame, a pair of endless belts having portions superimposed one upon the other and trained around the drum and a pair of rolls arranged one above the other and disposed so as to direct the upper and lower runs of said belts into substantially horizontal alinement with the axis of said drum.

2. In a print drier the combination of a supporting frame having a lateral extension, a roll carried by said extension, a drum rotatively mounted in said frame and disposed with its axis substantially in alinement with the axis of the roll, an upper roll and a lower roll disposed adjacent to the drum and having portions of their peripheries in alinement with the periphery of the first named roll, an endless belt trained around said drum and around the first named roll and disposed between the said upper and lower rolls, and a second endless belt trained around the drum and superimposed on the first named belt, the second named belt being trained under the said upper roll and disposed so as to extend at an angle to that portion of the first named belt located between the drum and the first named roll.

3. In a print drier the combination of a supporting frame, a drum rotatively mounted in the frame, a roll connected to the frame and disposed with its axis substantially in horizontal alinement with the axis of the drum, and an upper roll disposed adjacent to the drum and having the lower portion of its periphery in alinement with the upper portion of the periphery of the first named roll, a third roll disposed underneath the second roll and arranged between the drum and the first named roll, an inner endless belt trained around the drum and the first named roll and under the upper roll and over the third roll, an outer endless belt having a portion trained around the drum and superimposed on the inner belt, the upper and lower runs of said outer belt being disposed so that a portion of the former is disposed in angular relation to that portion of the inner belt trained around the first named roll and the latter over and under the third roll and successively disposed rolls for supporting the upper and lower runs of the outer belt.

4. In a print drier the combination of a supporting frame a roll carried by the supporting frame, a drum rotatively mounted in the supporting frame and having its axis substantially in horizontal alinement with the axis of the roll, an upper roll arranged adjacent to the drum and disposed with a portion of its periphery substantially in alinement with the periphery of the first named roll, a pair of lower rolls arranged one above the other and disposed beneath the upper roll and a third roll disposed in alinement with one of the lower rolls, a pair of endless belts having portions trained around the drum and superimposed one upon the other, said belts being trained under the upper roll and over and under the pair of lower rolls and over the third roll and disposed so as to separate one from the other at the upper roll and at the third roll, the inner of said belts being trained around the first named roll, and means for supporting the outer belt.

In testimony whereof I have signed my name to this specification this first day of July, 1916.

WILLIAM E. STROMBERG.